(12) United States Patent
Hsue

(10) Patent No.: US 11,433,469 B2
(45) Date of Patent: Sep. 6, 2022

(54) VIBRATION ASSISTED WIRE MACHINING DEVICE

(71) Applicant: National Kaohsiung University of Science and Technology, Kaohsiung (TW)

(72) Inventor: Wen-Jeng Hsue, Kaohsiung (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 0 days.

(21) Appl. No.: 16/869,323

(22) Filed: May 7, 2020

(65) Prior Publication Data
US 2020/0353548 A1 Nov. 12, 2020

(30) Foreign Application Priority Data

May 8, 2019 (TW) ................................. 108115924

(51) Int. Cl.
*B23H 7/08* (2006.01)
*B23H 7/38* (2006.01)

(52) U.S. Cl.
CPC ................ *B23H 7/08* (2013.01); *B23H 7/38* (2013.01)

(58) Field of Classification Search
CPC .................................... B23H 7/08; B23H 7/38
USPC ...................................................... 219/69.12
See application file for complete search history.

(56) References Cited

U.S. PATENT DOCUMENTS

| 2003/0038117 | A1 | 2/2003 | Pickel et al. | |
| 2004/0026379 | A1* | 2/2004 | Kimura | B23H 7/36 219/69.12 |
| 2016/0016243 | A1* | 1/2016 | Jang | B23H 7/04 204/224 M |

FOREIGN PATENT DOCUMENTS

JP          S54109696 A          8/1979

OTHER PUBLICATIONS

Official action issued by China National Intellectual Property Administration dated Apr. 15, 2021.
Official action issued by China National Intellectual Property Administration dated Nov. 3, 2021.

\* cited by examiner

*Primary Examiner* — Dana Ross
*Assistant Examiner* — Joe E Mills, Jr.
(74) *Attorney, Agent, or Firm* — Chun-Ming Shih; Lanway IPR Services

(57) ABSTRACT

A vibration assisted wire machining device is provided, the vibration assisted wire machining device allows a metal wire to be driven by a bi-axial sinusoidal vibration source during a wire machining process, wherein the bi-axial sinusoidal waveforms have the same amplitude, and preferably, the bi-axial sinusoidal waveforms are synchronous and always have a vibration phase difference of 90 degrees. Therefore, the present invention can reduce wire breakage risks and improve wire-cutting efficiency, and raise machining stability and material removal rate of a wire-electrical discharge machining (Wire-EDM) process performed on a workpiece, as well as achieve desirable precision of a geometric shape. It also relates to a vibration assisted wire machining device that enables metal wires associated with the abrasive slurry formed of hard abrasive grains, for performing bi-axial (Continued)

vibration assisted abrasive cutting or abrasive grinding on the workpiece.

7 Claims, 5 Drawing Sheets

VIBRATION ASSISTED WIRE MACHINING DEVICE

CROSS-REFERENCE TO RELATED APPLICATIONS

This application claims the priority of Republic of China Patent Application No. 108115924 filed on May 8, 2019, in the State Intellectual Property Office of the R.O.C., the disclosure of which is incorporated herein by reference.

BACKGROUND OF THE INVENTION

Field of the Invention

The present invention relates to machining fields, and more particularly, to a vibration assisted wire machining device that can prevent breakage of a metal wire used for cutting a workpiece by wire-cut electrical discharge machining (Wire-EDM) and improve the material removal rate as well as reduce drum-shape error for a high thickness workpiece. The present invention also relates to a vibration assisted wire machining device that allows a metal wire to work with a machining fluid containing abrasive grains to perform wire-cutting machining or wire grinding machining on a workpiece, so as to improve machining material removal rate and machining precision.

Descriptions of the Related Art

In recent years non-conventional machining techniques have been widely applied to materials that are hard to be cut by conventional machining techniques. Electrical discharge machining (EDM) is a common non-conventional machining process. In which, Wire-EDM works by having a dielectric fluid create an electrical discharge in a gap between a metal wire and a workpiece, which produces heat to melt the workpiece and form a discharge crater on the workpiece. These procedures are repeated to gradually complete the EDM process for the workpiece. EDM is desirably able to cut off or machine difficult-to-cut materials or hard conductors.

The above Wire-EDM process is however prone to wire breakage usually due to poor debris removal and concentrated discharge. Particularly, when it is to cut a high thickness workpiece, ineffective debris cleaning and the concentrated discharge on a local surface of a wire electrode often cause wire breakage, thereby adversely affecting machining efficiency and surface finish. There has been proposed a vibration assisted wire machining technique, which used a uniaxial vibration source to drive the metal wire to form a wave having antinodes that can achieve even discharge distribution across wire length, which was however only limited to distributing discharge pulse trains in one-dimensional direction. This undesirably leads to the reaming of hole expansion along a vibration-axial direction, and deteriorates precision of a geometric shape formed by such an EDM, for example, reduced circular roundness of a hole and arc accuracy. It makes such a vibration assisted wire machining technique fail to achieve high machining precision and quality. Therefore, how to solve the above uniaxial expansion in preventing from wire breakage and concentrated discharge problems to improve machining efficiency, precision and surface quality, is an important task in the art.

SUMMARY OF THE INVENTION

Given the above drawbacks in the prior art, a primary object of the present invention is to provide a vibration assisted wire machining device, which can solve the wire breakage and concentrated discharge problems in the prior art for Wire-EDM, and in generally can provide feasible vibration assisted wire machining device associated with slurry fluid in improve machining efficiency, and machining precision.

To achieve the above and other objects, a vibration assisted wire machining device for providing vibration assistance when it performs wire machining on a workpiece, the vibration assisted wire machining device including: a metal wire for performing wire machining on the workpiece; a core vibration structure for allowing the metal wire to extend to the workpiece, and having a first axial direction and a second axial direction that intersect; a first axis oscillator combined with the core vibration structure, for providing the metal wire with a first sinusoidal vibration in the first axial direction of the core vibration structure to make the metal wire vibrate along the first axial direction; and a second axis oscillator combined with the core vibration structure, for providing the metal wire with a second sinusoidal vibration in the second axial direction of the core vibration structure to make the metal wire vibrate along the second axial direction, wherein there is always a phase difference of 90 degrees between the first sinusoidal vibration and the second sinusoidal vibration, making the first axis oscillators and the second axis oscillators synchronously drive the metal wire via the core vibration structure.

Preferably, in the vibration assisted wire machining device said above, the first sinusoidal vibration has the same amplitude of waveform as the second sinusoidal vibration, the first sinusoidal vibration has the first displacement, and the second sinusoidal vibration has the second displacement; wherein, the first axial direction is vertical to the second axial direction, making the first displacement and the second displacement synchronously drive the wire machining part of the metal wire via the core vibration structure to move on a substantially circular trajectory with a radius of the amplitude.

Preferably, in the vibration assisted wire machining device said above, further including: a machining shaft and a vibration carrier, wherein the metal wire is extended from the machining shaft towards an intersection of the first axial direction and the second axial direction and through the vibration carrier, and wherein the vibration carrier is connected to the machining shaft, and carries the core vibration structure, the first axis oscillator and the second axis oscillator.

Preferably, in the vibration assisted wire machining device said above, wherein the vibration carrier further includes a weight structure for making the center of gravity of the vibration carrier substantially identical in position to the center of the metal wire on the core vibration structure.

Preferably, in the vibration assisted wire machining device said above, wherein: the vibration carrier includes an upper chamber and a lower chamber, wherein the core vibration structure is received in the upper chamber, and the first axial direction and the second axis oscillator are located in the upper chamber and combined with the core vibration structure; wherein, the lower chamber includes: a machining fluid inlet structure, a machining fluid guide structure, and a machining fluid outlet structure, the machining fluid inlet structure are for introducing a machining fluid into the lower chamber, the machining fluid guide structure is for leading the machining fluid in the lower chamber along a circumferential tangent direction, the machining fluid outlet structure is for allowing the machining fluid to exit the lower chamber.

Preferably, in the vibration assisted wire machining device said above, wherein, the upper chamber includes a drainage channel, the drainage channel is for draining off the liquid in the upper chamber to prevent liquid from staying in the upper chamber and affecting the operation of both the first axial direction and the second axis oscillator.

Preferably, in the vibration assisted wire machining device said above, the machining fluid guide structure has a guiding curved surface for allowing the machining fluid in the lower chamber to flow along the circumferential tangent direction in the lower chamber; the machining fluid outlet structure is located in the lower chamber and below a flow area of the machining fluid, and includes at least one through-hole formed at a circumferential position for accommodating the machining fluid in the lower chamber and releasing the machining fluid from the lower chamber.

Preferably, in the vibration assisted wire machining device said above, wherein, the vibration assisted wire machining device further includes a draft tube, wherein the draft tube is combined with the vibration carrier, close to the lower chamber and connected to the machining fluid outlet structure, wherein the metal wire passes through the draft tube, allowing the machining fluid exiting the machining fluid outlet structure to flow through the draft tube under a predetermined liquid pressure and enclose the metal wire.

Preferably, in the vibration assisted wire machining device said above, further including: supply of a machining fluid to the workpiece, wherein the machining fluid includes abrasive slurry formed of hard abrasive grains for providing bi-axial vibration assisted abrasive cutting or abrasive grinding when the metal wire performs wire machining on the workpiece.

The vibration assisted wire machining device according to the present invention has the following advantages.

In the present invention, discharge pulses are distributed across a metal wire utilizing a plurality of antinodes of vibration waveforms formed by driving the metal wire to have bi-axial vibrations, wherein bi-axial synchronous vibrations particularly distribute discharge points, thereby reducing concentrated discharge and eliminating wire breakage risks and uniaxial reaming of expansion in uniaxial vibration assisted machining. Moreover, the present invention can disperse EDM discharges along the wire surface and improve wire-cutting efficiency, as well as raise stability and material removal rate of a Wire-EDM process performed on a workpiece. The present invention achieves desirable precision of a geometric shape (for example, circular roundness of a hole and arc accuracy) formed by such an EDM, and also reduces drum-shape error (for example, for a high thickness workpiece). Therefore, the vibration assisted wire machining device according to the present invention can desirably accomplish high efficiency and high precision workpiece.

Moreover, the present invention further includes the supply of a machining fluid to the workpiece, wherein the machining fluid includes abrasive slurry formed of hard abrasive grains, for providing bi-axial vibration assisted abrasive cutting or abrasive grinding assistance when the metal wire performs wire machining on the workpiece, thereby in favor of high efficiency and high precision machining.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
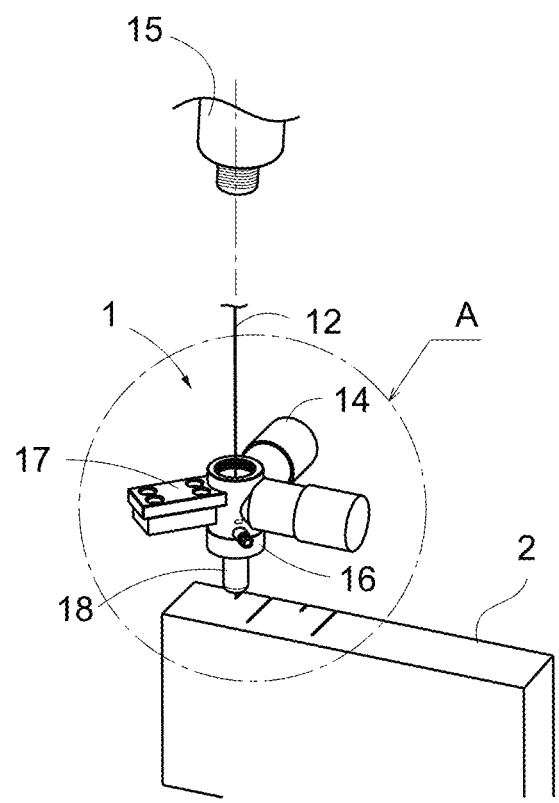
FIG. 1 is a schematic diagram showing an EDM process by a vibration assisted wire machining device according to the present invention.
Figure 2:
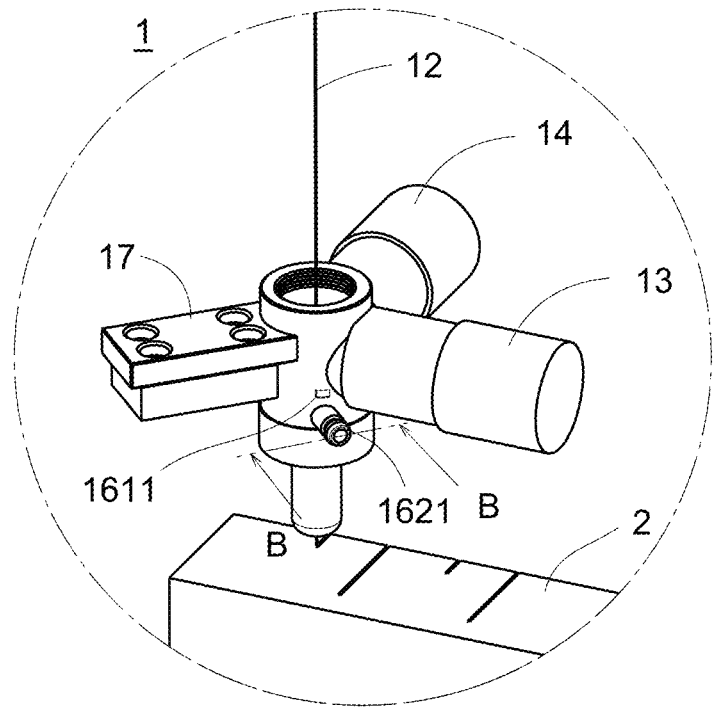
FIG. 2 is an enlarged view of area A of the vibration assisted wire machining device shown in FIG. 1.
Figure 3:
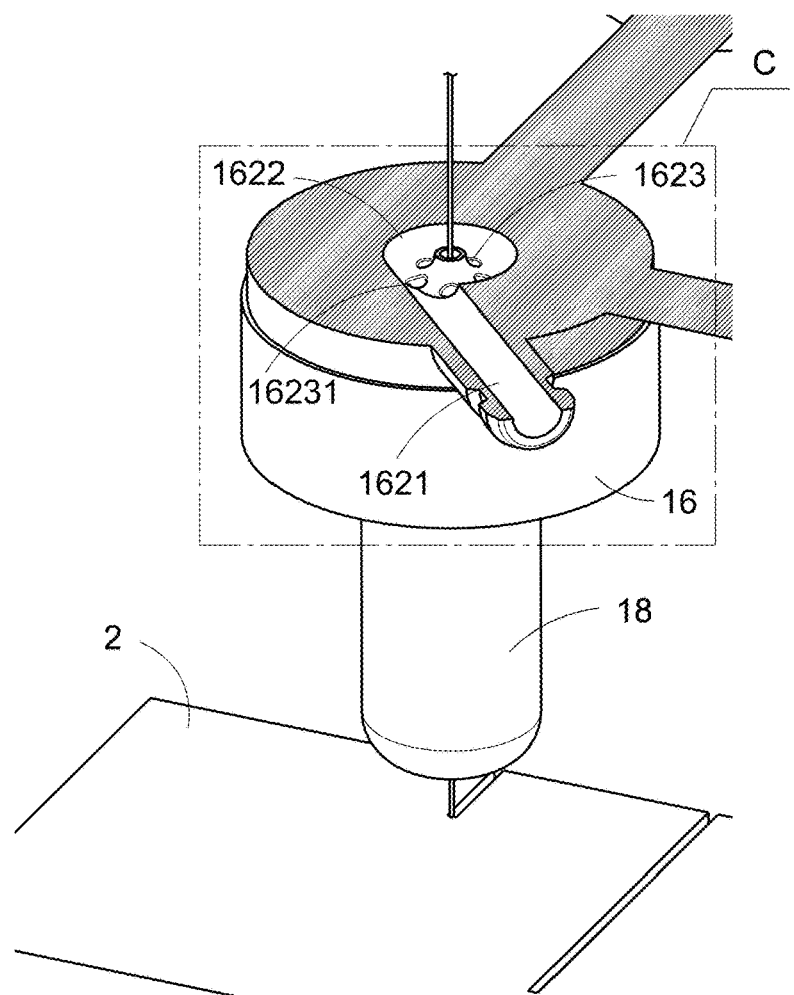
FIG. 3 is a cross-sectional view of a part shown in FIG. 2 cut along line B-B.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Referring to FIGS. 1 to 10, a vibration assisted wire machining device 1 according to the present invention is used to provide vibration assistance when it performs wire machining on a workpiece 2. In particular, the vibration assisted wire machining device 1 is, for example, a vibration assisted wire-cutting or wire grinding electric discharge machining (EDM) device, or a vibration assisted wire machining device not for EDM. The vibration assisted wire machining device 1 includes: a core vibration structure 11, a metal wire 12, a first axis oscillator 13 and a second axis oscillator 14. The metal wire 12 is selectively, for example, an electrode wire. The vibration assisted wire machining device 1 further includes: a machining shaft 15, a vibration carrier 16 and a weight structure 17. It should be noted that, the first axis oscillator 13 and the second axis oscillator 14 can together be used as a biaxial vibration source, and the core vibration structure 11 is, for example, a wire guide used for guiding and directing the metal wire.

The vibration carrier 16 is combined with the machining shaft 15 that thus provides support and positioning for the vibration carrier 16. The core vibration structure 11, the weight structure 17, the first axis oscillator 13 and the second axis oscillator 14 are mounted on and carried by the vibration carrier 16. The metal wire 12 is extended from the machining shaft 15 through the vibration carrier 16 to the workpiece 2, and is used to perform wire machining (such as Wire-EDM) on the workpiece 2. The weight structure 17 makes the center of gravity of the vibration carrier 16 substantially identical in position to the center of the metal wire 12 on the core vibration structure 11 in order to maintain stability of vibration assisted wire machining.

Figure 6:
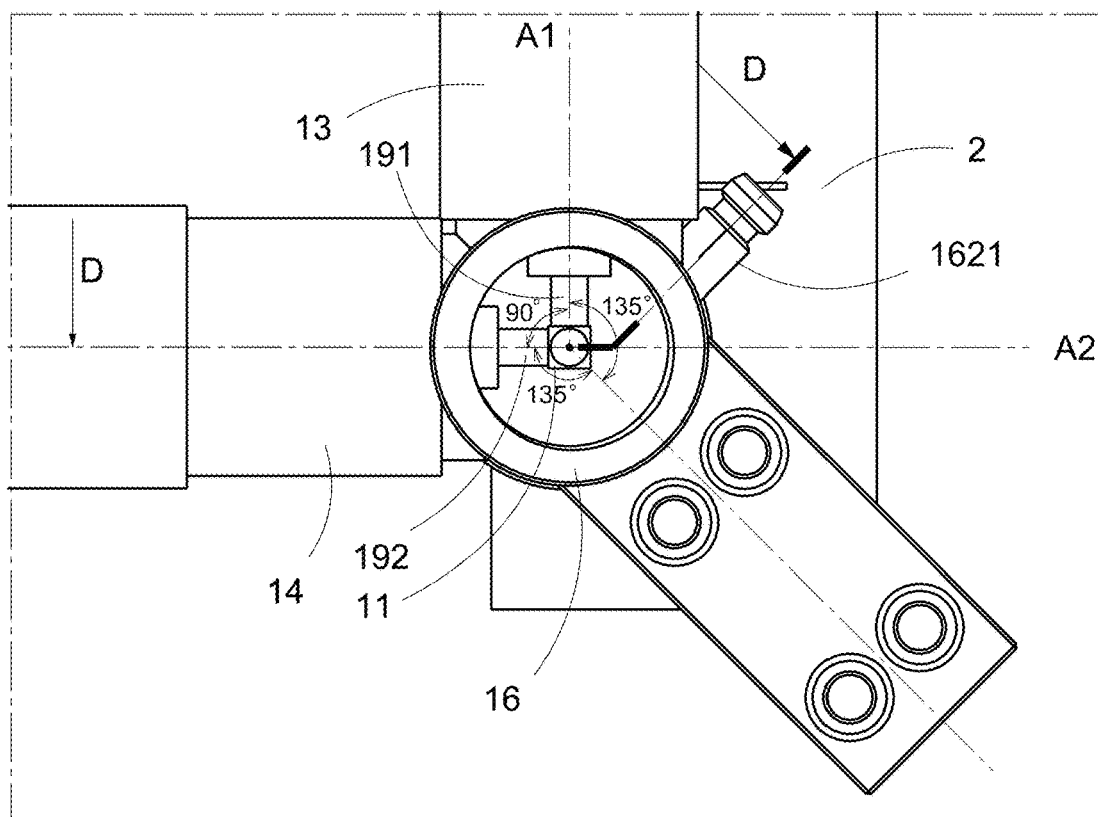
FIG. 6 is a top view of the vibration assisted wire machining device according to the present invention.

Preferably, as shown in FIG. 6, a central line of the first axis oscillator 13 and a central line of the second axis oscillator 14 intersect at 90 degrees; a central line of the weight structure 17 and the central line of the first axis oscillator 13 intersect at 135 degrees; and the central line of the weight structure 17 and the central line of the second axis oscillator 14 intersect at 135 degrees. This is to make the center of gravity of the vibration carrier 16 substantially identical in position to the center of the metal wire 12 on the core vibration structure 11.

Figure 5:
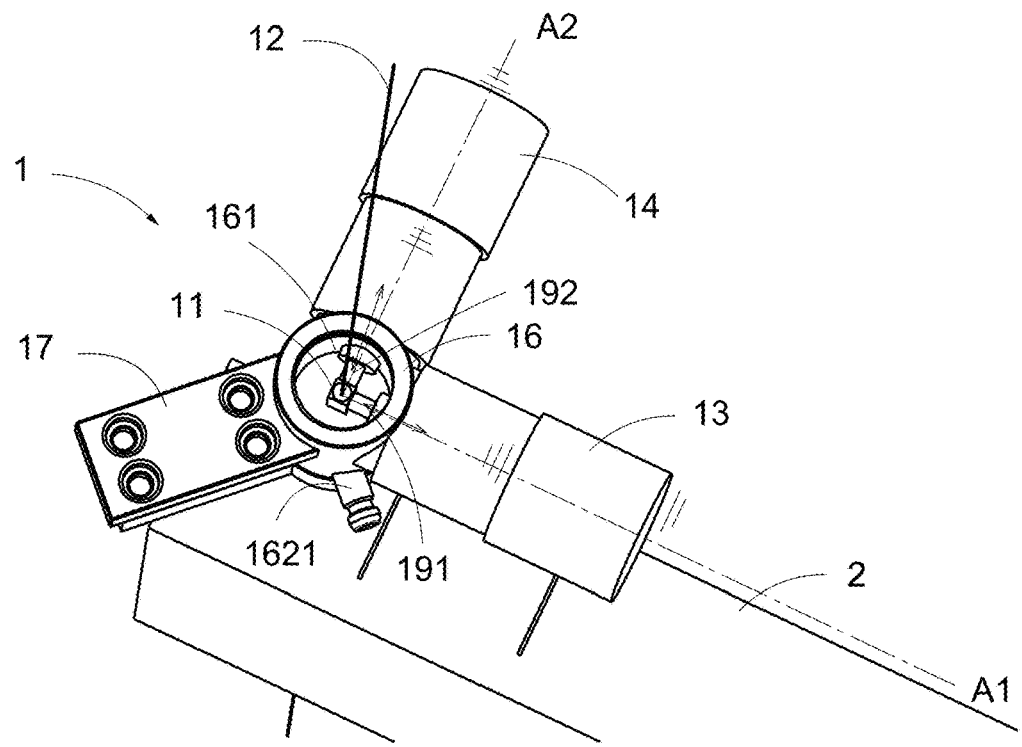
FIG. 5 is a schematic diagram showing a usage status of the vibration assisted wire machining device according to the present invention.
Figure 10:
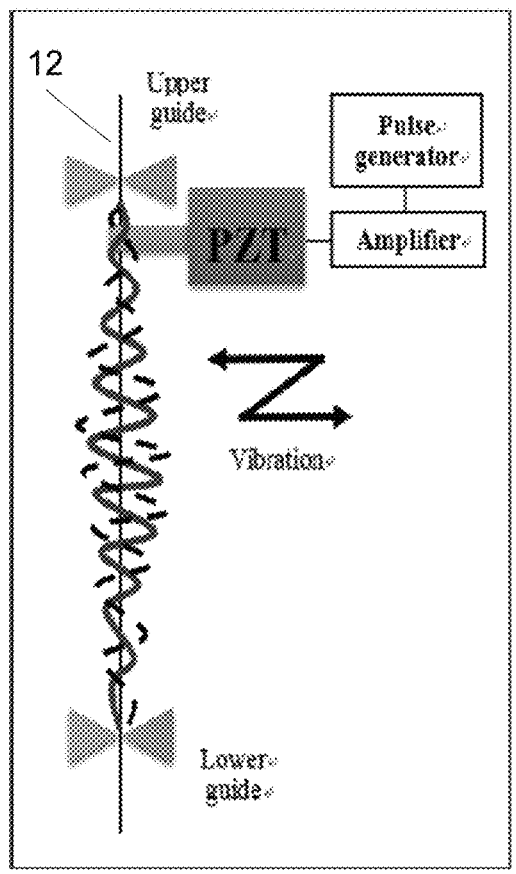
FIG. 10 is a schematic diagram showing a vibration status of an axial metal wire in the vibration assisted wire machining device according to the present invention.

As shown in FIG. 5, the core vibration structure 11 is used to actuate the metal wire 12, which is, for example, a hollow-block wire guide for guiding and directing the metal wire 12 (the wire guide has an inner hole sized for accommodating the metal wire to pass through with clearance fit tolerance), or a guide with constraint or a clamp. The core vibration structure 11 has a first axial direction A1 and a second axial direction A2, which are vertical to each other. The metal wire 12 is extended from the machining shaft 15 towards an intersection of the first axial directions A1 and the second axial directions A2 of the core vibration structure 11, through the vibration carrier 16 and the hole of the core vibration structure 11, to the workpiece 2 where the metal wire 12 can perform wire machining (such as EDM) on the workpiece 2. The first axis oscillator 13 is mounted at a first position on the core vibration structure 11, and provides a first sinusoidal vibration in the first axial direction A1 of the core vibration structure 11 for the metal wire 12 to make the metal wire 12 vibrate along the first axial direction A1 at an operating time. The second axis oscillator 14 is mounted at a second position on the core vibration structure 11, and provides a second sinusoidal vibration in the second axial direction A2 of the core vibration structure 11 for the metal wire 12 to make the metal wire 12 vibrate along the second axial direction A2 at the operating time. As shown in FIG. 10, it shows a status of the metal wire 12 being simultaneously subjected to the first sinusoidal vibration and the second sinusoidal vibration. As shown in FIG. 5, the core vibration structure 11 includes a first axial guiding bar 191 and a second axial guiding bar 192. The first axial guiding bar 191 is extended along the first axial direction A1, allowing the first axis oscillator 13 to provide the first sinusoidal vibration via the first axial guiding bar 191 for the metal wire 12. The second axial guiding bar 192 is extended along the second axial direction A2, allowing the second axis oscillator 14 to provide the second sinusoidal vibration via the second axial guiding bar 192 for the metal wire 12. Preferably, the first axis oscillator 13 and the second axis oscillator 14 are, for example, ultrasonic oscillators, and the first axial guiding bar 191 and the second axial guiding bar 192 are, for example, ultrasonic horns.

Figure 9:
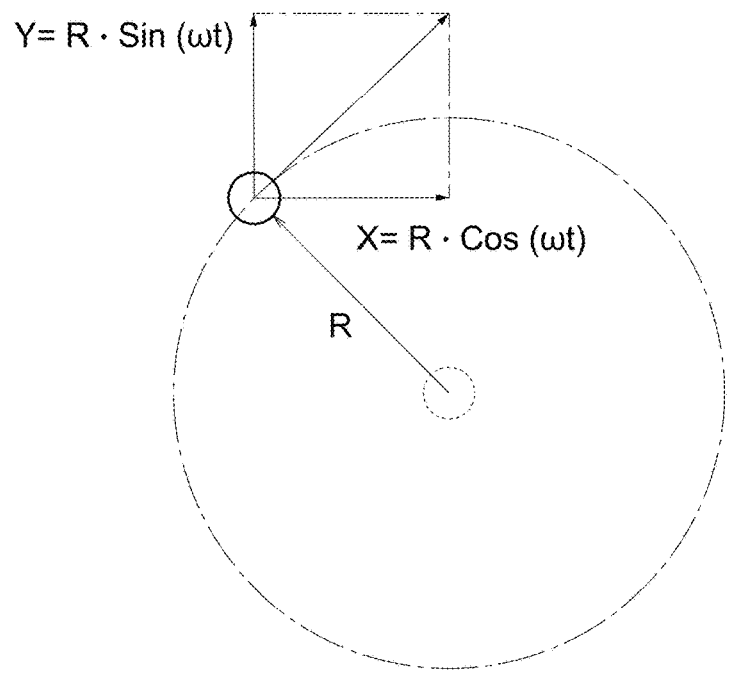
FIG. 9 is a schematic diagram showing a circular trajectory of a metal wire in the vibration assisted wire machining device according to the present invention.

Preferably, the first sinusoidal vibration and the second sinusoidal vibration have the same amplitude R. This can prevent breakage of the metal wire 12 performing EDM on the workpiece 2 and eliminate uniaxial reaming of hole expansion. For instance, as shown in FIG. 9, the first sinusoidal vibration has a first displacement X and the second sinusoidal vibration has a second displacement Y, wherein for example, if the first displacement X is equivalent to a product of amplitude R and Cos(ωt), then the second displacement Y is made equivalent to a product of amplitude R and Sin(ωt), and there is a 90 degree phase difference between the second sinusoidal vibration and the first sinusoidal vibration, such that the first displacement X and the second displacement Y synchronously drive a wire machining part of the metal wire 12 via the core vibration structure 11 to move on an geometric trajectory. Preferably, the first displacement X and the second displacement Y are vertical to each other and synchronously drive the core vibration structure 11 to make the metal wire 12 move on a substantially circular trajectory with a radius of amplitude R. Preferably, ω=2πf, wherein ω is vibration angular frequency, f is vibration frequency, and t is vibration time. Preferably, f is larger than or equal to 10 KHz, for dispensing discharge pulses to other positions of the workpiece by a plurality of antinodes of a vibration waveform, and amplitude R is sized smaller than a discharge gap for performing EDM on the workpiece 2.

Figure 7:
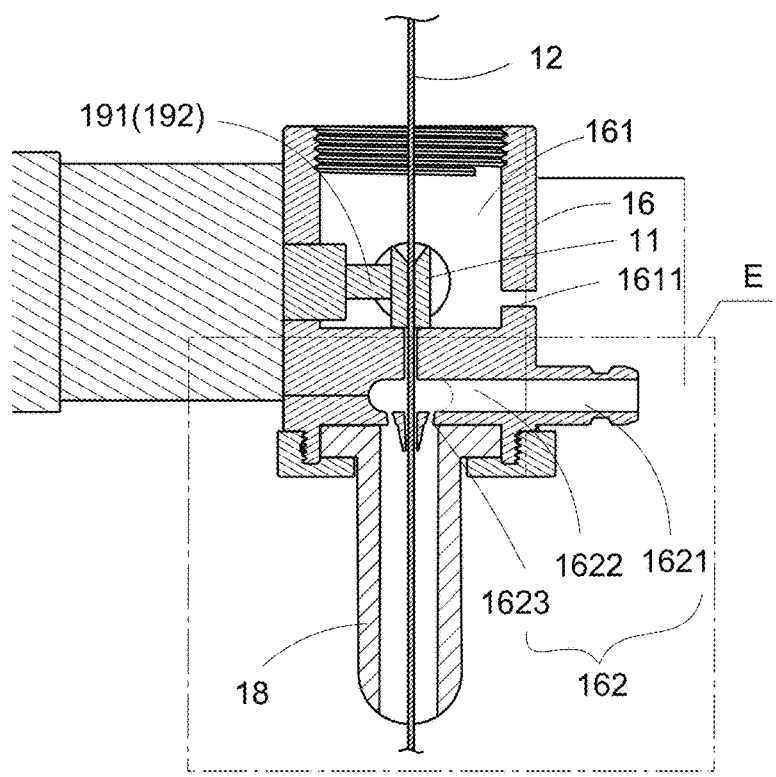
FIG. 7 is a cross-sectional view of a part shown in FIG. 6 cut along line D-D.
Figure 8:
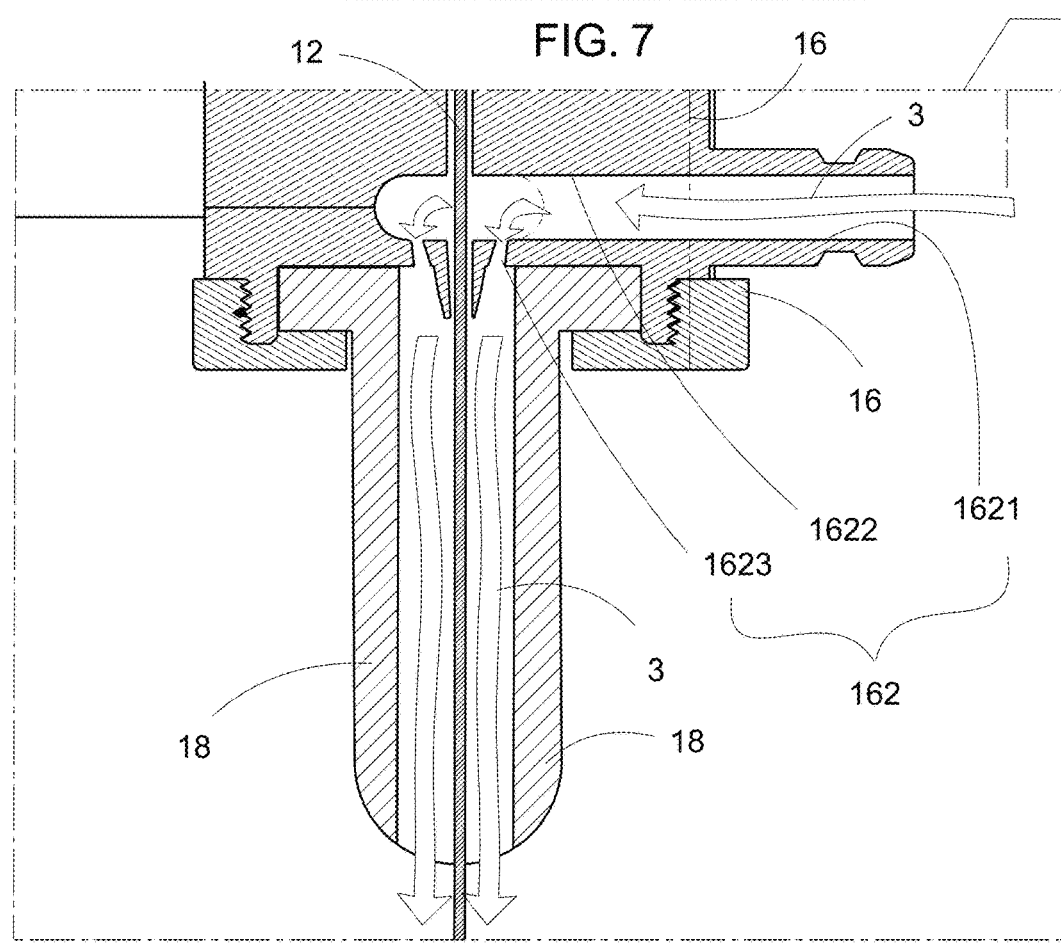
FIG. 8 is an enlarged view of area E of a part shown in FIG. 7.

As shown in FIGS. 7 to 8, preferably, the vibration carrier 16 includes an upper chamber 161 and a lower chamber 162, wherein the metal wire 12 can be extended from the upper chamber 161 to the lower chamber 162. The core vibration structure 11 is received in the upper chamber 161, and the first axis oscillator 13 and the second axis oscillator 14 reside in the upper chamber 161 and are combined with the core vibration structure 11. As shown in FIG. 7, if there is any liquid in the upper chamber 161, it can affect operation of both the first axis oscillator 13 and the second axis oscillator 14, such that the upper chamber 161 is selectively formed with a drainage channel 1611 for draining off liquid in the upper chamber 161 to prevent liquid from staying in the upper chamber 161.

Figure 4:
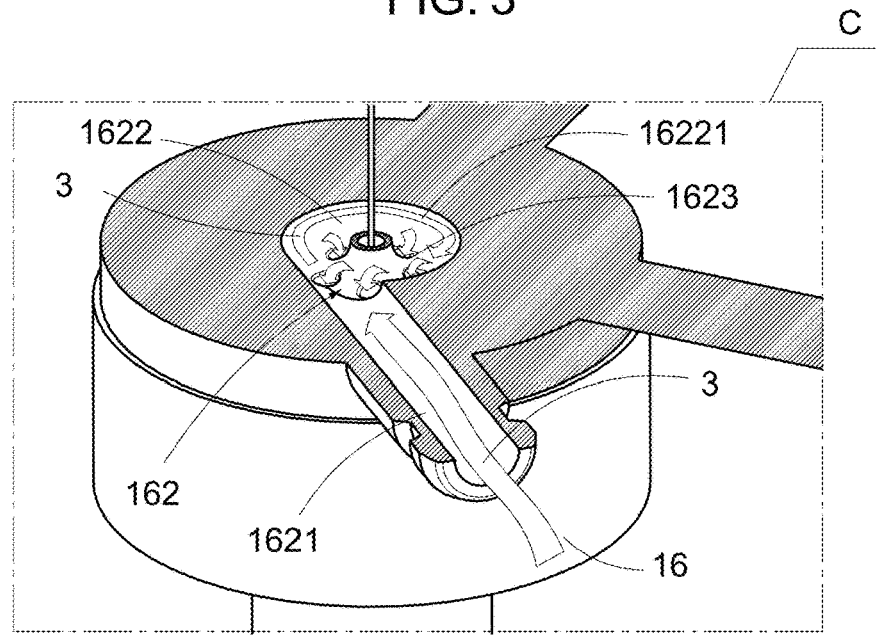
FIG. 4 is an enlarged view of area C of a part shown in FIG. 3.

The lower chamber 162 includes a machining fluid inlet structure 1621, a machining fluid guide structure 1622 and a machining fluid outlet structure 1623. The machining fluid inlet structure 1621 is used to introduce an external machining fluid, for example, abrasive slurry formed of hard abrasive grains, into the lower chamber 162, for use in subsequent wire machining (such as wire-cutting or wire grinding) performed on the workpiece. The machining fluid guide structure 1622 guides and directs flow of the machining fluid in the lower chamber 162 along a circumferential tangent direction. As shown in FIG. 4, preferably, the machining fluid guide structure 1622 has a guiding curved surface 16221 for allowing the machining fluid 3 in the lower chamber 162 to flow along the circumferential tangent direction in a vortex way. The machining fluid outlet structure 1623 directs flow of the machining fluid 3 in the lower chamber 162 out in a manner of making it quickly leave the lower chamber 162. As shown in FIG. 4, preferably, the machining fluid outlet structure 1623 is located in the lower chamber 162 and below a flow area of the machining fluid, and includes at least one through hole 16231 formed at a circumferential position for accommodating the machining fluid in the lower chamber 162 and releasing the machining fluid from the lower chamber 162, such that the machining fluid can cover the metal wire 12 and then flow to the workpiece 2.

Preferably, the vibration assisted wire machining device 1 further includes a draft tube 18 for helping the flow of the machining fluid. The draft tube 18 is combined with the vibration carrier 16, close to the lower chamber 162 and connected to the machining fluid outlet structure 1623. As shown in FIG. 8, the metal wire 12 passes through the draft tube 18, and the machining fluid 3 exiting the machining fluid outlet structure 1623 can flow through the draft tube 18 under a predetermined liquid pressure and on a predetermined track to cover the metal wire 12, such that the machining fluid 3 is supplied to the metal wire 12 during a wire machining process (for example, wire-cutting or wire grinding).

Therefore, the vibration assisted wire machining device according to the present invention allows a metal wire to be driven by a bi-axial sinusoidal vibration source during a wire machining process (for example, EDM wire-cutting or grinding), wherein bi-axial sinusoidal vibration waveforms have the same amplitude, and preferably, the bi-axial sinusoidal vibration waveforms are synchronous and always have a vibration phase difference of 90 degrees. This can reduce uniaxial reaming of hole expansion and achieve desirable precision of products made by wire machining (for example, EDM wire-cutting or grinding).

Moreover, compared to the current uniaxial vibration assisted Wire-EDM technique using uniaxial vibrations and causing hole expansion along a vibration-axial direction while deteriorating machining precision, the present invention is to distribute discharge pulses across a metal wire by means of a plurality of antinodes of vibration waveforms formed by driving the metal wire to have bi-axial vibrations, wherein bi-axial synchronous high-frequency vibrations particularly distribute discharge points, thereby reducing concentrated discharge and eliminating wire breakage and uniaxial reaming of hole expansion. The present invention thus effectively overcomes all the drawbacks in the prior art and is highly advantageous.

Preferably, the present invention further includes supplying a machining fluid to a workpiece, wherein the machining fluid includes abrasive slurry formed of hard abrasive grains, for providing cutting or grinding assistance when the metal wire performs wire machining (wire-cutting or wire grinding) on the workpiece.

The examples above are only illustrative to explain principles and effects of the invention, but not to limit the invention. It will be apparent to those skilled in the art that modifications and variations can be made without departing from the scope of the invention. Therefore, the protection range of the rights of the invention should be as defined by the appended claims.

What is claimed is:

1. A vibration assisted wire machining device for providing vibration assistance when it performs wire machining on a workpiece, the vibration assisted wire machining device including:
   a metal wire for performing wire machining on the workpiece;
   a core vibration structure for allowing the metal wire to extend to the workpiece, and having a first axial direction and a second axial direction that intersect;
   a first axis oscillator combined with the core vibration structure, for providing the metal wire with a first sinusoidal vibration in the first axial direction of the core vibration structure to make the metal wire vibrate along the first axial direction;
   a second axis oscillator combined with the core vibration structure, for providing the metal wire with a second sinusoidal vibration in the second axial direction of the core vibration structure to make the metal wire vibrate along the second axial direction, wherein there is always a phase difference of 90 degrees between the first sinusoidal vibration and the second sinusoidal vibration, making the first axis oscillator and the second axis oscillator synchronously drive the metal wire via the core vibration structure
   wherein the vibration carrier includes an upper chamber and a lower chamber, wherein the core vibration structure is received in the upper chamber, and the first axis oscillator and the second axis oscillator are located in the upper chamber and combined with the core vibration structure;
   wherein the lower chamber includes a machining fluid inlet structure, a machining fluid guide structure, and a machining fluid outlet structure, the machining fluid inlet structure is for introducing a machining fluid into the lower chamber, the machining fluid guide structure is for leading the machining fluid in the lower chamber along a circumferential tangent direction, the machining fluid outlet structure is for allowing the machining fluid to exit the lower chamber;
   wherein the upper chamber includes a drainage channel, the drainage channel is for draining off liquid in the upper chamber so as to prevent liquid from staying in the upper chamber and affecting operation of both the first axis oscillator and the second axis oscillator; the machining fluid guide structure has a guiding curved surface for allowing the machining fluid in the lower chamber to flow along the circumferential tangent direction in the lower chamber; the machining fluid outlet structure is located in the lower chamber and below a flow area of the machining fluid, and includes at least one through-hole formed at a circumferential position for accommodating the machining fluid in the lower chamber and releasing the machining fluid from the lower chamber.

2. The vibration assisted wire machining device according to claim 1, wherein:
   the first sinusoidal vibration has the same amplitude of waveform as the second sinusoidal vibration, the first sinusoidal vibration has a first displacement, and the second sinusoidal vibration has a second displacement; wherein, the first axial direction and the second axial direction are intersected vertically, making the first displacement and the second displacement synchronously drive the wire machining part of the metal wire via the core vibration structure to move on a circular trajectory with a radius of the amplitude.

3. The vibration assisted wire machining device according to claim 1, wherein the vibration assisted wire machining device further including: a machining shaft and a vibration carrier, wherein the metal wire is extended from the machining shaft towards the intersection of the first axial direction and the second axial direction and through the vibration carrier, and wherein the vibration carrier is connected to the machining shaft, and carries the core vibration structure, the first axis oscillator and the second axis oscillator.

4. The vibration assisted wire machining device according to claim 2, wherein the vibration assisted wire machining device further including: a machining shaft and a vibration carrier, wherein the metal wire is extended from the machining shaft towards the intersection of the first axial direction and the second axial direction and through the vibration carrier, and wherein the vibration carrier is connected to the machining shaft, and carries the core vibration structure, the first axis oscillator and the second axis oscillator.

5. The vibration assisted wire machining device according to claim 1, wherein the vibration carrier further includes a weight structure for making the center of gravity of the vibration carrier identical in position to the center of the metal wire on the core vibration structure so as to maintain the stability of vibration assisted wire machining device.

6. The vibration assisted wire machining device according to claim 1, wherein:

the vibration assisted wire machining device further includes a draft tube, wherein the draft tube is combined with the vibration carrier, close to the lower chamber and connected to the machining fluid outlet structure, wherein the metal wire passes through the draft tube, allowing the machining fluid exiting the machining fluid outlet structure to flow through the draft tube under a predetermined liquid pressure and encloses the metal wire.

7. The vibration assisted wire machining device according to claim 1, further including: supply of a machining fluid to the workpiece, wherein the machining fluid includes abrasive slurry formed of hard abrasive grains for providing bi-axial vibration assisted cutting or grinding during the wire machining on the workpiece.

* * * * *